United States Patent [19]
Freitas

[11] Patent Number: 5,535,219
[45] Date of Patent: Jul. 9, 1996

[54] SONET/SDH POINTER CALCULATION CIRCUIT

[75] Inventor: Oscar W. Freitas, Cape Elizabeth, Me.

[73] Assignee: National Semiconductor Corp., Santa Clara, Calif.

[21] Appl. No.: 490,236

[22] Filed: Jun. 14, 1995

[51] Int. Cl.$^6$ ................................................ H04J 3/06
[52] U.S. Cl. ...................... 370/105.1; 370/110.1
[58] Field of Search ........................... 370/100.1, 102, 370/105.1, 105.4, 112, 55, 110.1, 108; 375/354, 365

[56] References Cited

U.S. PATENT DOCUMENTS

| | | | |
|---|---|---|---|
| 4,998,242 | 3/1991 | Upp | 370/60 |
| 5,210,762 | 5/1993 | Weeber et al. | 371/69.1 |
| 5,335,223 | 8/1994 | Iino | 380/108 |
| 5,404,380 | 4/1995 | Powell et al. | 370/102 |
| 5,461,622 | 10/1995 | Bleickardt et al. | 370/102 |
| 5,471,476 | 11/1995 | Hiramoto | 370/105.1 |

*Primary Examiner*—Hassan Kizou
*Attorney, Agent, or Firm*—Daniel H. Kane, Jr.

[57] ABSTRACT

A pointer processing circuit processes SONET/SDH frames and calculates a new pointer value. A pointer interpreter circuit (PI) is constructed to receive an incoming frame, identify the pointer in transport overhead bytes of the frame, interpret the pointer, and send the pointer value directly to a pointer generator circuit (PG). The pointer value indicates the position of the first byte of the data payload bytes of the incoming frame starting at the trace byte J1. The PI is constructed to tag the next data byte after the pointer H1 H2 and negative justification data holding byte location H3 and send the tagged data byte directly to a FIFO without the delay of counting down to the trace byte J1 of the incoming frame. A first in first out memory FIFO is coupled to the PI for writing data payload bytes from the incoming frame into the FIFO. A pointer generator circuit (PG) is coupled to the FIFO for changing the pointer on the outgoing frame. The PG is constructed to determine the position of the tagged data byte relative to the outgoing frame and receive the value of the pointer for the previous incoming frame directly from the PI. The pointer generator is also constructed to calculate a new pointer value for the outgoing frame based upon the position of the tagged data byte relative to the outgoing frame and the pointer value for the previous incoming frame.

12 Claims, 10 Drawing Sheets

SONET/SDH POINTER CALCULATION CIRCUIT

TECHNICAL FIELD

This invention relates to a new pointer processor circuit for processing SONET/SDH frames. A pointer interpreter circuit (PI) receives an incoming frame, interprets the pointer from transport overhead bytes pointing to the start of the synchronous payload envelope of data bytes, and writes the data payload bytes to a first in first out memory (FIFO). A pointer generator circuit reads the data payload bytes into an outgoing frame and calculates a new pointer. The invention provides a new method and circuit for calculating the pointer for the outgoing frame based upon the value of the previous pointer for the incoming frame and the position of the first data byte following the pointer relative to the outgoing frame without the delay of counting to the J1 trace byte and the start of the synchronous payload envelope of the incoming frame.

BACKGROUND ART

The SONET system is intended for implementing the electronic/photonic interface for fiber optic communication networks according to the new Synchronous Optical Network (SONET) Standard defined in ANSI Standard T1.105 etc. According to the SONET Standard, electronic signals are formatted in synchronous transport signal (STS) frames of 810 bytes with 125 µS frame time period and base transmission rate of 51.840 Mb/s. The STS frames include the transport overhead bytes and a synchronous payload envelope (SPE) of data bytes combined in a standard frame format of 9 rows of bytes by 90 columns of bytes. The basic SONET STS-1 frame is constructed with three columns of transport overhead bytes as the first three columns followed by 87 columns of SPE data bytes. Each row is therefore composed of 3 transport overhead bytes and 87 data bytes. The SPE also includes one column of path overhead bytes.

Within each STS frame the synchronous payload envelope (SPE) may be composed of so called virtual tributaries (VT's), i.e., data structures from lower speed or lower frequency service networks. The VT's are packaged or multiplexed together in the synchronous payload envelopes of STS frames for high speed SONET transmission. Multiple STS frames can also be multiplexed together in a single STS-N frame structure.

Internationally, the SONET system is referred to as synchronous digital hierarchy or SDH. The basic SDH frame is similar to an STS-3 frame of 9 rows by 270 columns. The rows are divided into an initial 9 columns of transport overhead bytes followed by 261 columns of data bytes. Each row is therefore composed of 9 transport overhead bytes followed by 261 data bytes.

In summary, SONET ANSI T1 sets the standard for the formatting of data into frames of transport overhead bytes and data payload envelopes, the multiplexing of formatted data, processing of frames, scrambling of data for power modulation, and generally the data handling and management for interfacing electronic signals with optical carriers on fiber optic transmission networks.

Referring to FIG. 1, a typical pointer processor circuit consists of a pointer interpreter (PI), first in first out memory (FIFO) and a pointer generator (PG). The PI circuit receives an incoming frame, locates the pointer in the transport overhead bytes of the incoming frame identified as the H1 H2 bytes, and interprets the pointer which points to and gives the location of the trace byte J1. J1 identifies the start of the synchronous payload envelope of data bytes for that incoming frame. The PI then writes the data bytes of the incoming frame to the FIFO.

The pointer generator constructs a new pointer H1 H2 because generally the data payload envelope of data bytes will begin at a different location of the synchronous payload envelope in the outgoing frame compared to the incoming frame. The incoming and outgoing frames are independent of each other. The pointer generator circuit also reads the data bytes from the FIFO and begins constructing a new SONET frame as the outgoing frame.

The pointer processor of the present invention including the PI, FIFO, and PG is part of the overall SONET/SDH frame processing circuit. For example the PI is coupled on the upstream side to a frame detector circuit for detecting overhead bytes from the incoming frame. This circuit checks the incoming framing bytes A1A2 and other overhead bytes. Transport overhead bytes are extracted from the circuit and parity bytes are checked.

The PG circuit is coupled to a multiplexing circuit or MUX followed by an overhead insertion circuit for restoring new transport overhead bytes to the outgoing frame. The multiplexer or MUX constructs the frame according to a STS-N formula, parity bits are inserted, and finally the bits are modulated by a feedback scrambler. It is noted that feedback scrambling is not for the purpose of encryption but for modulating power by distributing pulse signal edges.

The SONET STS frames themselves can be multiplexed into N frame structures. For example a 3 to 1 multiplexer will combine 3 STS-1 frames into a single STS-3 frame as illustrated in FIG. 1A. Synchronous multiplexing is achieved by interleaving bytes at corresponding locations of the respective STS frames after aligning the transport overhead bytes of the respective STS frames. A multiplexed STS-N frame has the same frame time period of 125 µS as an STS-1 frame. The SONET Standard accommodates byte interleaved synchronous multiplexing STS-N of at least 48 STS frames. An STS-48 frame results in SONET Signal transmission rates in the 2 gHz range (e.g. 48×51.840 Mb/s).

A typical SONET/SDH pointer processor consists of a pointer interpreter (PI), a first in first out memory (FIFO) and a pointer generator (PG) as illustrated in FIG. 1. The PI block receives the incoming frame, interprets the pointer bytes, and counts down to the first byte of the payload. The first data byte of the payload is identified by the J1 byte or trace byte. This byte is tagged and sent through the FIFO. When this byte is received in the PG block, the new pointer is calculated based on when this tagged byte arrives relative to the outgoing frame.

For instance if the incoming frame has a pointer value of 400, then the payload bytes are counted until the 400th byte is being sent through the FIFO starting at the byte following the H3 byte per SONET/SDH standards. This byte which is the J1 path overhead trace byte, would be tagged. If this tagged byte is received by the PG block when the 10th payload byte of the next outgoing frame is being processed, then the pointer in the next frame will be 10. The delay in counting down the bytes to the start of the payload in the PI block, can lead to a two-frame delay in changing pointers on the outgoing frame.

OBJECTS OF THE INVENTION

It is therefore an object of the present invention to provide a new pointer processor circuit that calculates the new pointer for the outgoing frame without the delay of up to two frame time periods. It is an object of the invention to limit the delay in calculating a new pointer to at most one frame time period delay.

Another object of the invention is to avoid the delay introduced when the pointer interpreter has to count from the pointer to the J1 trace byte and the start of the data payload bytes for the incoming frame. According to the invention, the pointer generator circuit does not have to wait for the location of J1 trace byte of the incoming frame in order to calculate the new pointer.

A further object of the invention is to provide sufficient data to the PG upon arrival of an incoming frame for calculating a new pointer for the outgoing frame without the delay of waiting for the countdown to the J1 trace byte.

DISCLOSURE OF THE INVENTION

In order to accomplish these results the present invention provides a new pointer processing circuit for processing SONET/SDH frames and calculating a new pointer value. The SONET/SDH frames incorporate transport overhead bytes including a pointer H1 H2 followed by a negative justification data holding byte location H3. The SONET/SDH frames also incorporate a data payload of data bytes with a trace byte J1 at the start of the data payload bytes for a particular frame. The pointer H1 H2 points to the trace byte J1 which indicates the start of the data payload bytes for the particular frame.

A pointer interpreter circuit (PI) is constructed to receive an incoming frame, identify the pointer in transport overhead bytes of the frame, interpret the pointer, and send the pointer value directly to a pointer generator circuit. This pointer value indicates the position of the first byte of the data payload bytes of the incoming frame starting at the incoming frame trace byte J1.

According to the invention the PI is also constructed to tag the next data byte after the pointer and negative justification data holding byte location H3. The PI sends the tagged data byte directly to a FIFO without the delay of counting down to the trace byte J1 of the incoming frame. The first in first out memory (FIFO) is coupled to the PI for writing data bytes from the incoming frame into the FIFO.

A pointer generator circuit (PG) is coupled to the FIFO for changing the pointer on the outgoing frame. The PG is constructed to determine the position of the tagged data byte relative to the outgoing frame and receive the value for the pointer of the previous incoming frame directly from the PI. According to the invention the pointer generator is also constructed to calculate a new pointer value for the outgoing frame based upon the position of the tagged data byte relative to the outgoing frame and the pointer value for the previous incoming frame thereby reducing delay in changing pointers.

The SONET/SDH frame is constructed with a first number of transport overhead byte locations and a specified number of data payload byte locations. The pointer generator circuit PG is further constructed to calculate the value of the new pointer for the outgoing frame by the following formula: (position of tagged data byte relative to outgoing frame)+(previous value for pointer on incoming frame), remainder, modulo (highest count or highest number of the data payload bytes per frame).

In the case of SONET frames with 783 data byte locations identified as 0–782, the modulo or modulus is 783. In the case of SDH frames with 2349 data byte locations identified as 0–2348, the modulo is 2349.

Other objects, features and advantages of the invention are apparent in the following specification and accompanying drawings.

DESCRIPTION OF PREFERRED EXAMPLE EMBODIMENTS AND BEST MODE OF THE INVENTION

A standard practice in the design of integrated circuits is to define the circuit in terms of the logic functions it will perform and this may be expressed in flow charts or a software language. As the circuit evolves it is then described in a hardware description language (HDL) such as VERILOG. VERILOG is available from Cadance Design Systems, Inc. of San Jose, Calif. The circuit is expressed in text based VERILOG statements referred to as a VERILOG behavioral netlist. The VERILOG behavioral netlist is equivalent to a program in C.

The VERILOG statements are then converted from the behavioral netlist to a logic gate netlist by a design compiler. An example of such a design compiler is the SYNOPSYS Design Compiler available from SYNOPSYS, Inc., Mountain View, Calif. The design compiler also composes a circuit from the logic gate netlist performing the behavioral functions defined by the VERILOG behavioral netlist. One of the outputs of the SYNOPSYS design compiler is a schematic circuit diagram.

The present invention is disclosed according to this standard practice in the form of flow charts defining the logic function of the circuits. These flow charts and associated text description in the specification can readily be converted to VERILOG statements in a VERILOG behavioral netlist. The VERILOG statements are then translated to logic gates by a design compiler and the design compiler composes a circuit. All of the automated steps by VERILOG and SYNOPSYS are available for translating these flow charts into hardware schematic circuit diagrams. Disclosure of the flow charts and accompanying text in the detail here provided therefore constitute a full and adequate disclosure of the invention.

Figure 1:
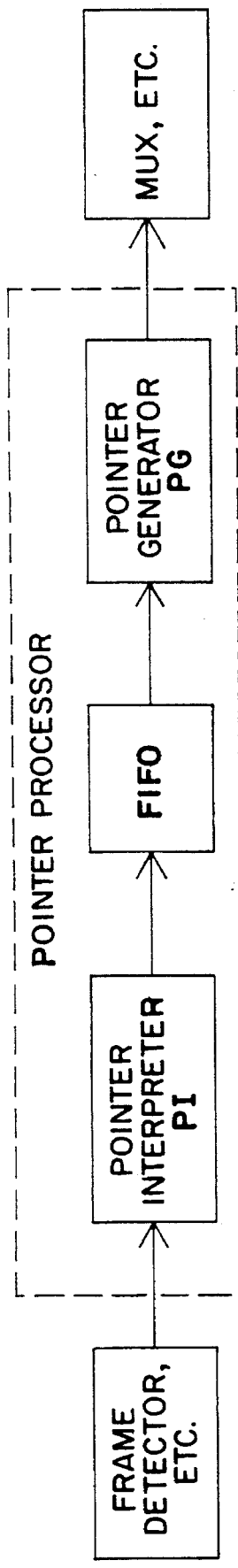
FIG. 1 is a block diagram of a generalized pointer processor circuit.
Figure 2:
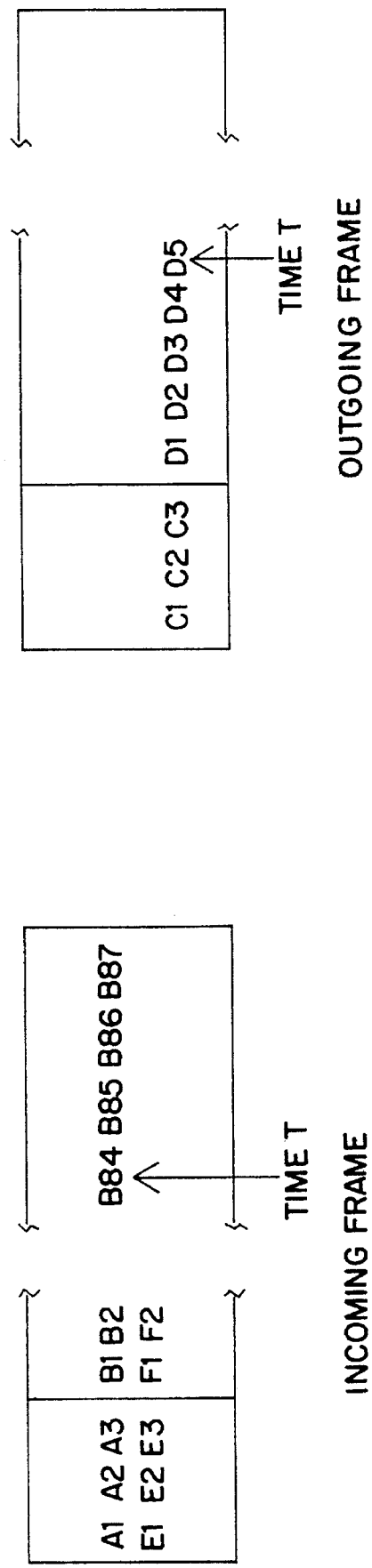
FIG. 2 is a block diagram of an incoming frame and an outgoing frame showing correlation at Time T for calculating a new pointer.
Figure 1A:
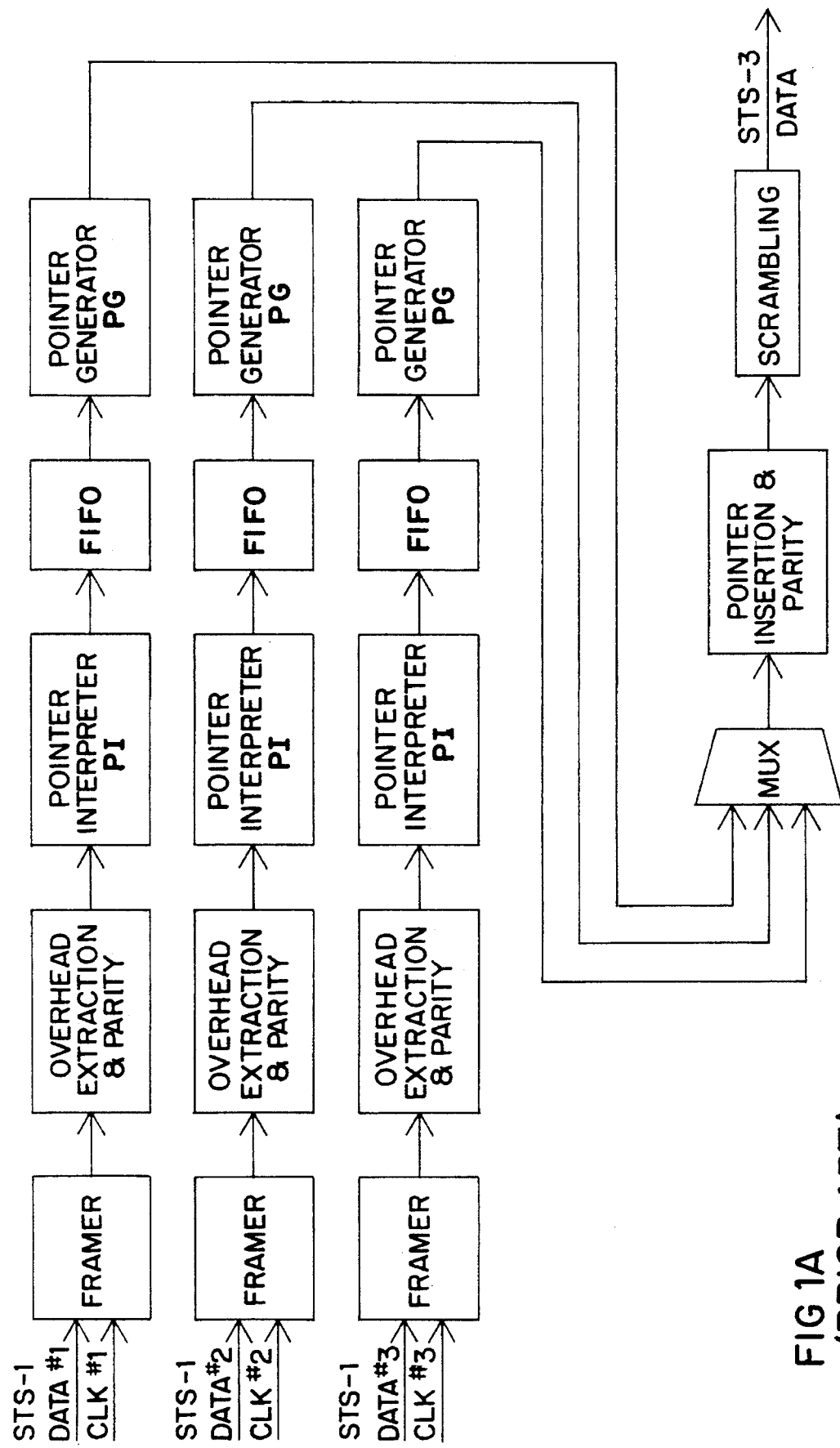
FIG. 1A is a block diagram of an STS-1 to STS-3 pointer processor circuit of the SONET frame processing circuit.
Figure 3A:
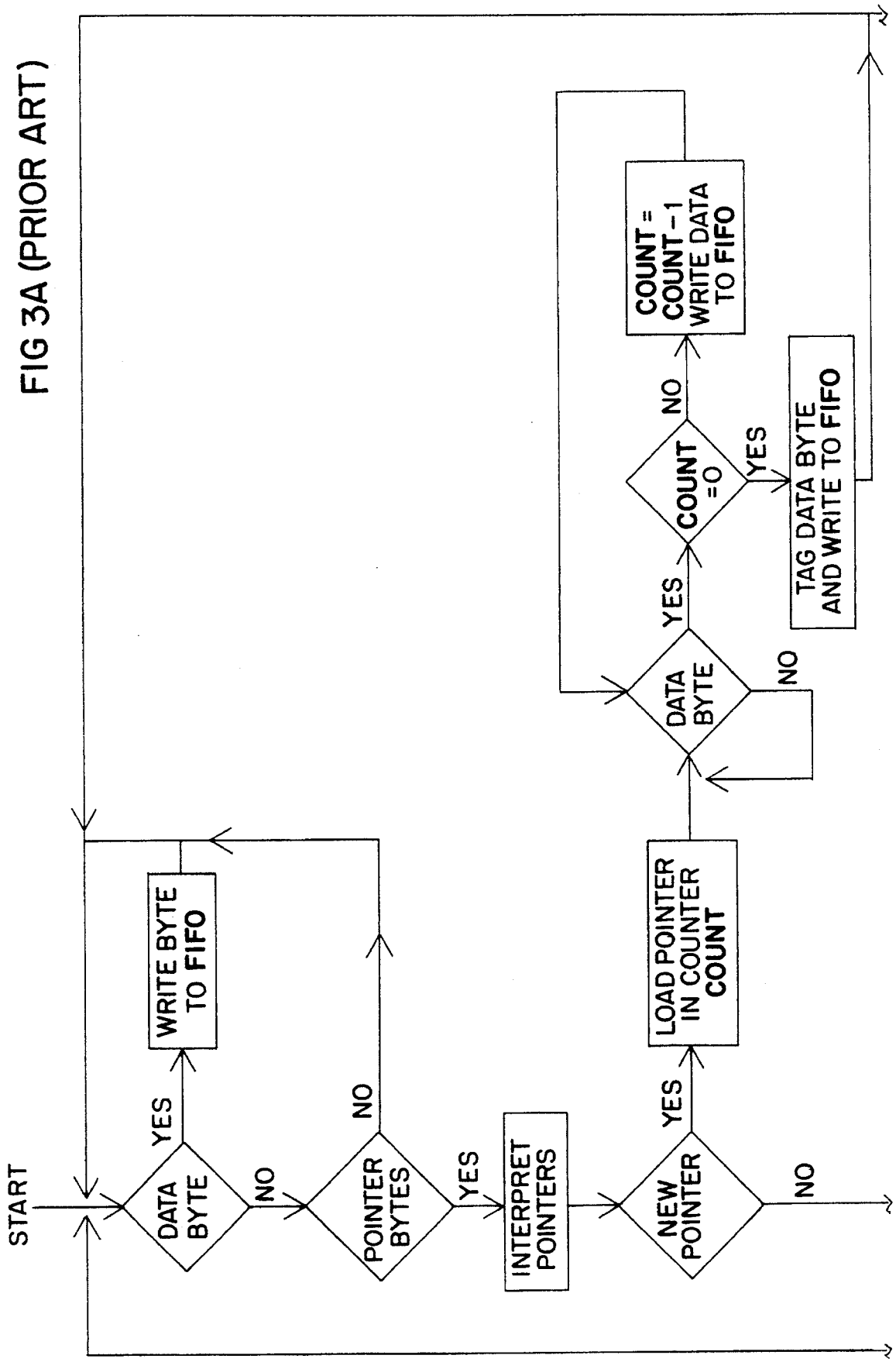
FIG. 3 is composed of FIGS. 3A and 3B which form a flow chart of a prior art pointer interpreter circuit (PI) suitable for hardware description language (HDL).
FIGS. 3C and 3D are a flow chart of a pointer interpreter circuit according to the invention.
Figure 3B:
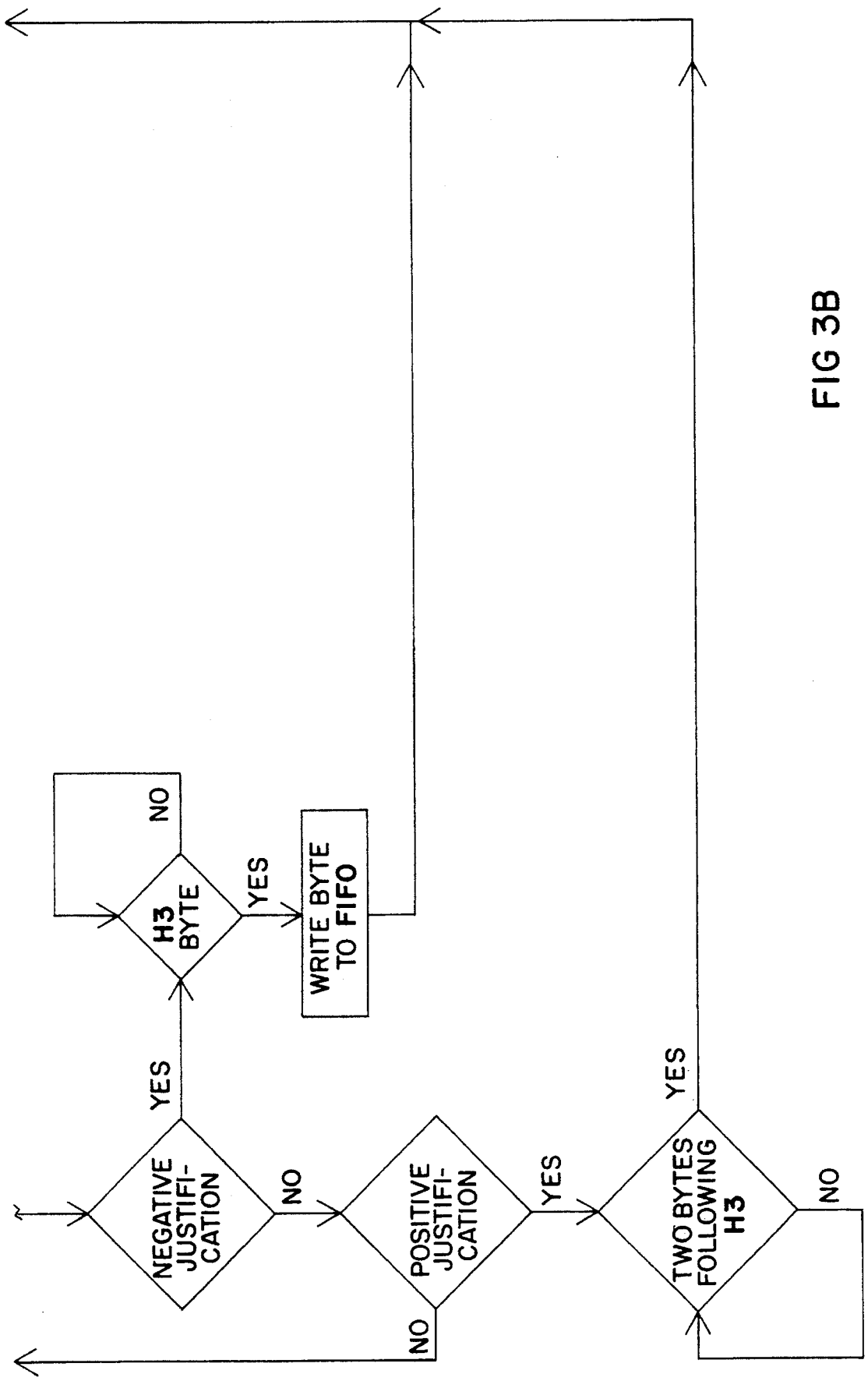

A prior art pointer interpreter circuit is illustrated in FIG. 3, composed of FIGS. 3A and 3B, in order to contrast the present invention with the prior art. Referring to FIG. 3A, the pointer interpreter writes data bytes to the FIFO. Upon reaching the pointer bytes H1 H2, the PI interprets the pointer bytes, and if it is a new pointer, loads the pointer in a counter, and begins the countdown to the start of the synchronous payload data bytes for that incoming frame. The countdown continues to the J1 trace byte which indicates the start of the payload data bytes. It is this countdown that can cause a delay of up to two frame periods. The first data byte of the payload is then tagged so that it will be recognized by the PG and is then sent to the FIFO.

Referring to FIG. 3B, the PI then checks to see if a negative justification is required. If so, the data byte temporarily stored in the negative justification data byte holding location H3 is written to the FIFO. If not the PI checks to see if a positive justification is required. If so the dummy byte or stuff byte following the H3 location is passed over. At the second data byte following H3, the PI resumes transferring data bytes to the FIFO.

Whether or not a negative justification is indicated or a positive justification is indicated is determined according to one example procedure as follows. The pointer bits making up the bytes are alternately designated I bits and D bits. The following convention is observed according to this particular example for determining justifications. If the majority of D bits are inverted and the majority of I bits are not and NDF bits are normal, then there is a negative justification. Conversely, if the majority of I bits are inverted and the majority of D bits are not, and the NDF bits are new, then there is a positive justification.

Figure 3C:
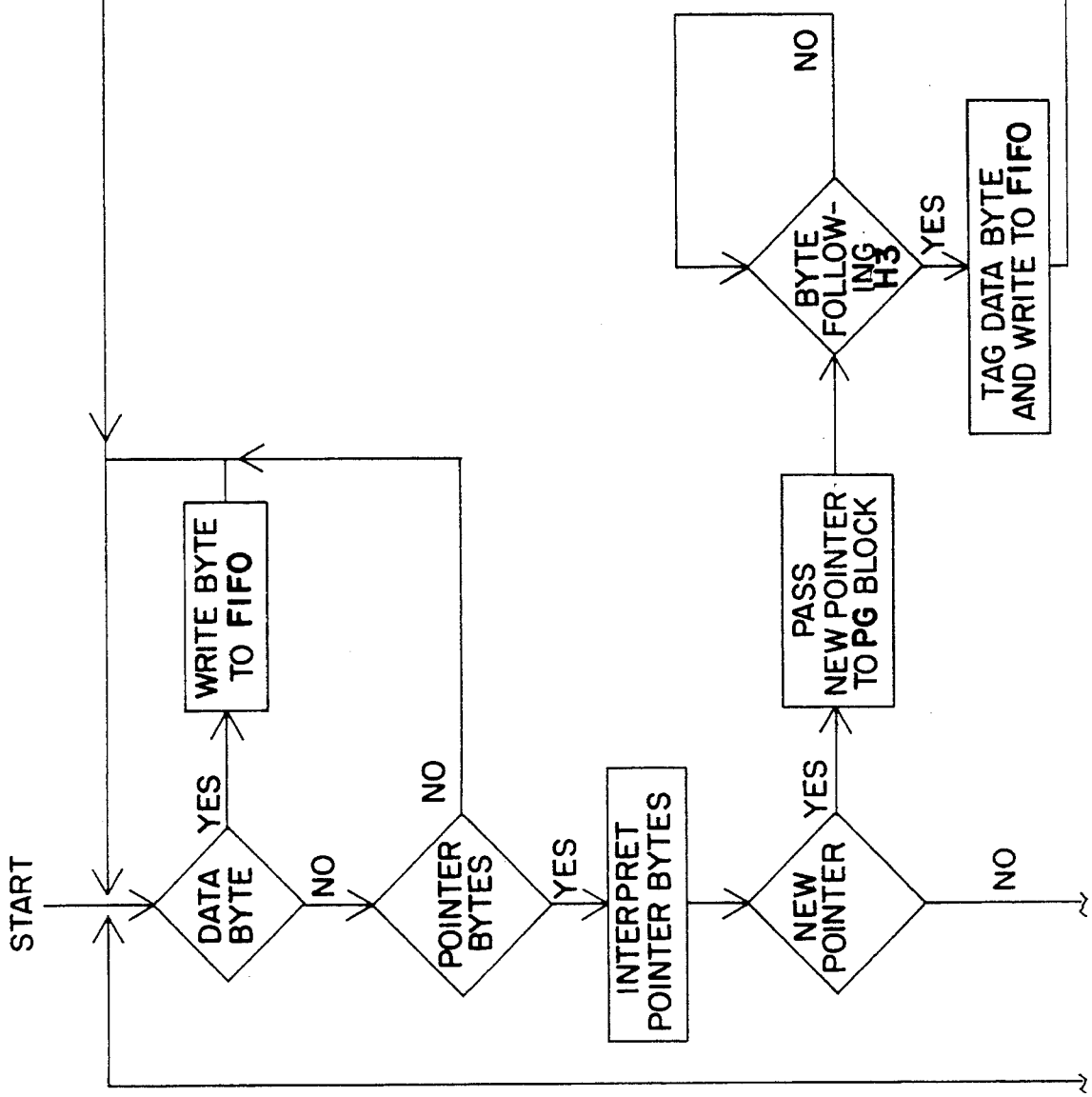
Figure 3D:
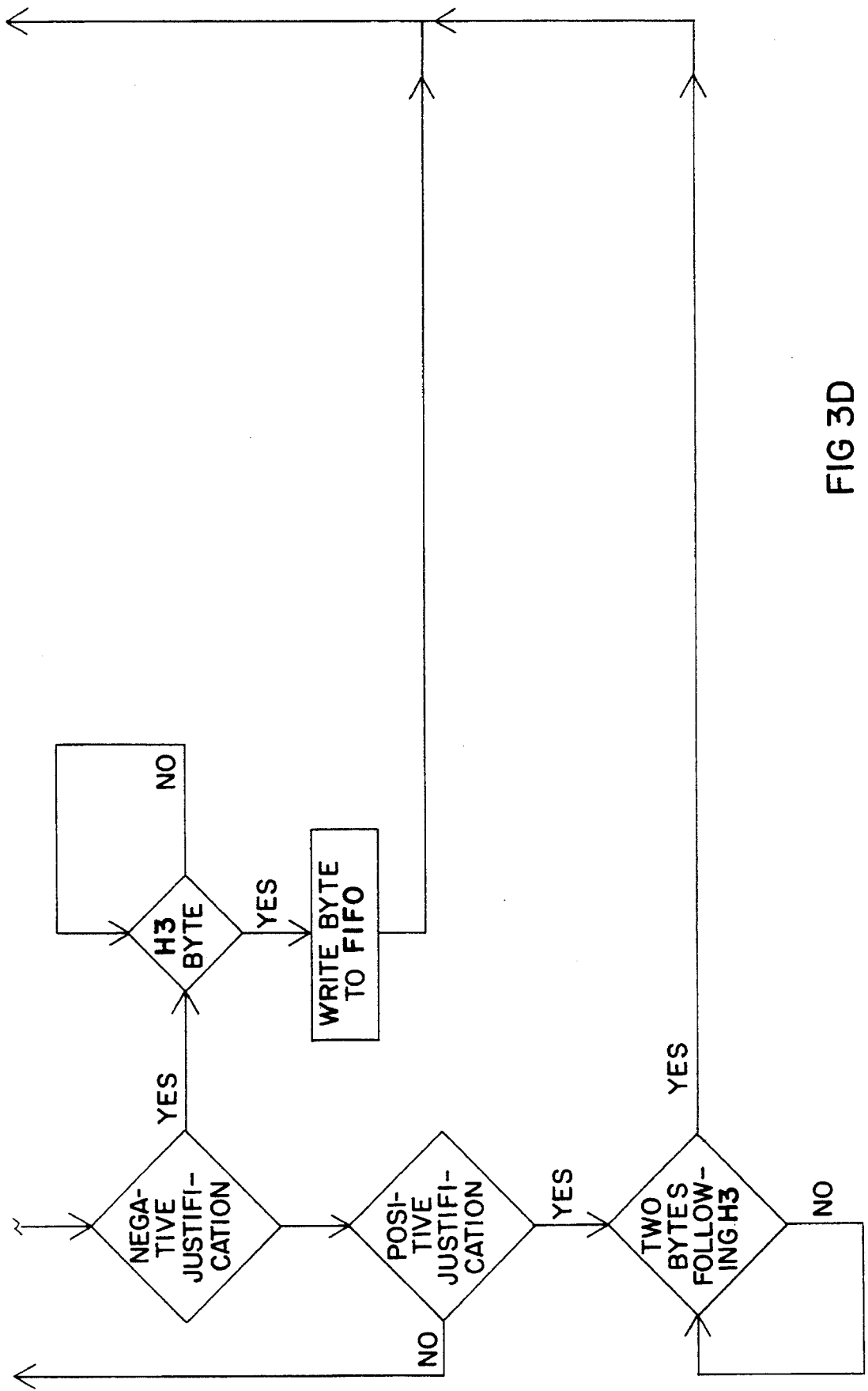

A pointer interpreter circuit according to the present invention is illustrated in FIGS. 3C and 3D. The new pointer interpreter differs from the prior art in several respects. First, after the pointer bytes are retrieved by the PI and interpreted, a new pointer value from the incoming frame is passed directly to the pointer generator circuit. This is not done in the prior art method. However in the present method, this value of the pointer from the incoming frame is used by the PG in calculating the pointer for the outgoing frame.

Second, the PG immediately tags the next data byte following the pointer bytes H1 H2 and the negative justification data byte holding location H3. This is the first data byte after the bytes H1 H2 H3. It is tagged instead of waiting to tag the first payload data byte following the trace byte J1. Third, there is no countdown of the pointer value to the first payload data byte following the trace byte J1. In the prior art method there must be a countdown because the new pointer is calculated based upon this information.

Finally the PG calculates a new pointer for the outgoing frame based upon the value of the pointer from the incoming frame which was sent directly to the PG by the PI, and the position of the data byte following H1 H2 H3 of the incoming frame relative to the outgoing frame. This is also determined immediately. There is no waiting for the countdown through the value of the pointer from the incoming frame to trace byte J1 where the payload data byte for a particular frame actually begins. These values are added together and the new pointer value is the remainder after subtracting a modulus 782 for SONET frames and modulus 2348 for SDH frames. More generally, the modulus is the maximum number of data payload bytes per frame.

Figure 4A:
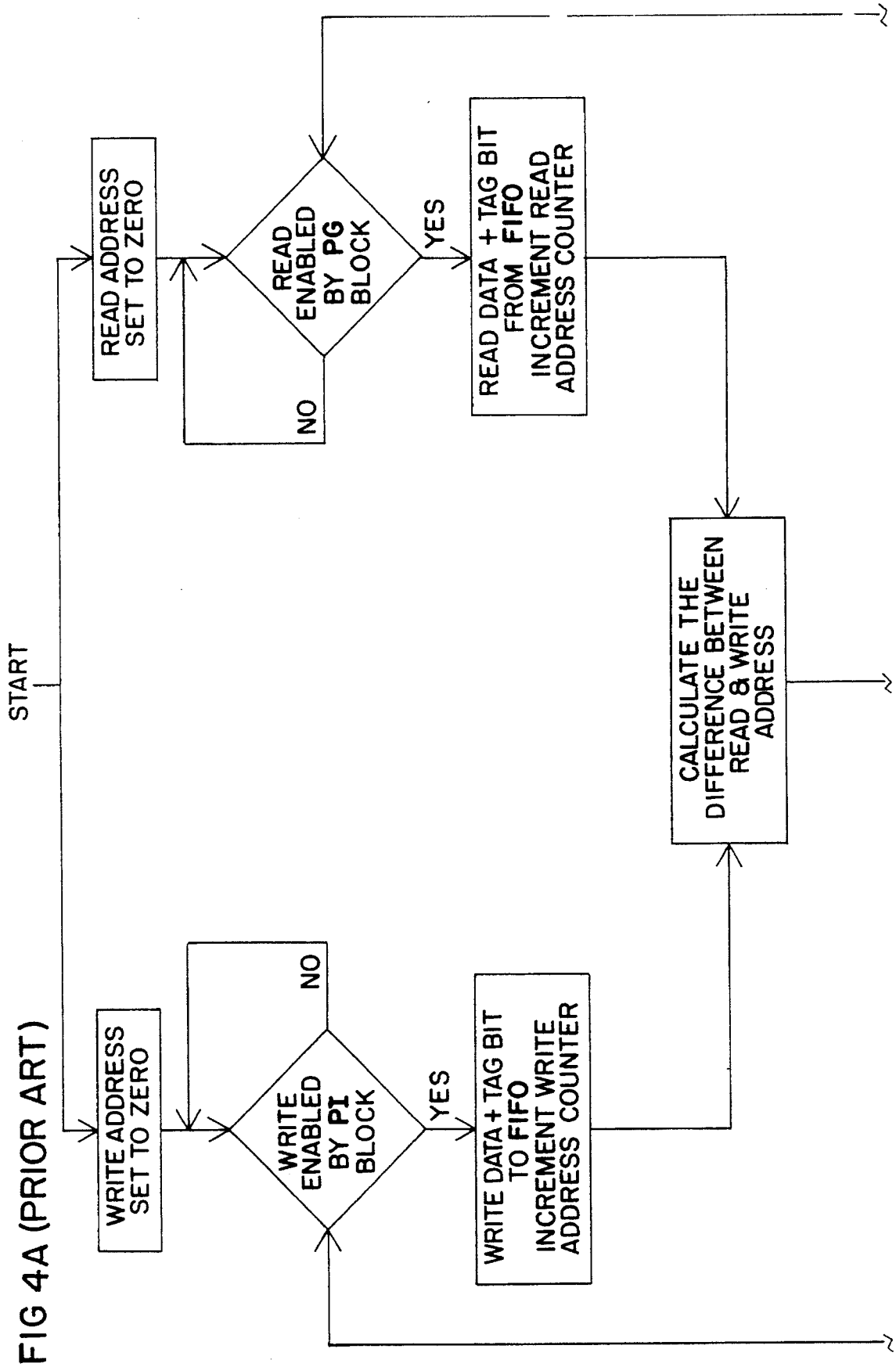
FIG. 4 is composed of FIGS. 4A and 4B which form A flow chart for a standard FIFO controller.
Figure 4B:
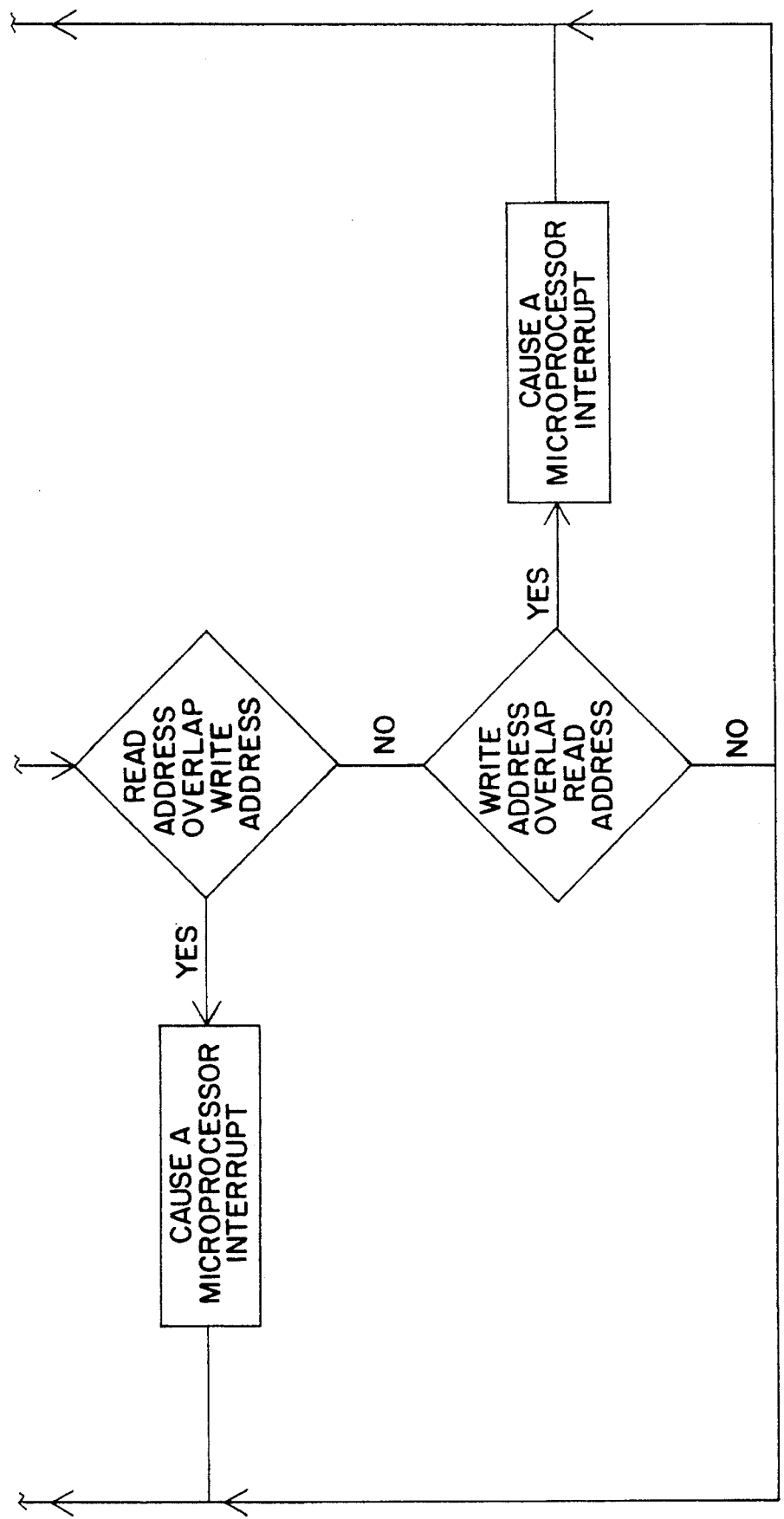

A FIFO control suitable for use in the present invention is illustrated in FIG. 4 composed of FIGS. 4A and 4B. Referring to FIG. 4A, the write cycle is shown on the left side and the read cycle is shown on the right side. The FIFO is typically a 32 byte buffer memory with byte addresses 0–31. The write cycle operates until the FIFO is for example, half full, e.g. bytes 0–15, and then the read cycle starts. Other levels can of course be selected. If the write cycle catches up to the read cycle so that the read address and write address overlap, and the FIFO control attempts to read and write at the same address, an interrupt occurs as shown in FIG. 4B interrupting the write cycle while the FIFO control continues reading. Similarly, if the read cycle overlaps the write cycle, an interrupt occurs interrupting the read cycle while the FIFO control continues writing. Typically, only data bytes are written into and read out of the FIFO, although this rule can vary.

Figure 5A:
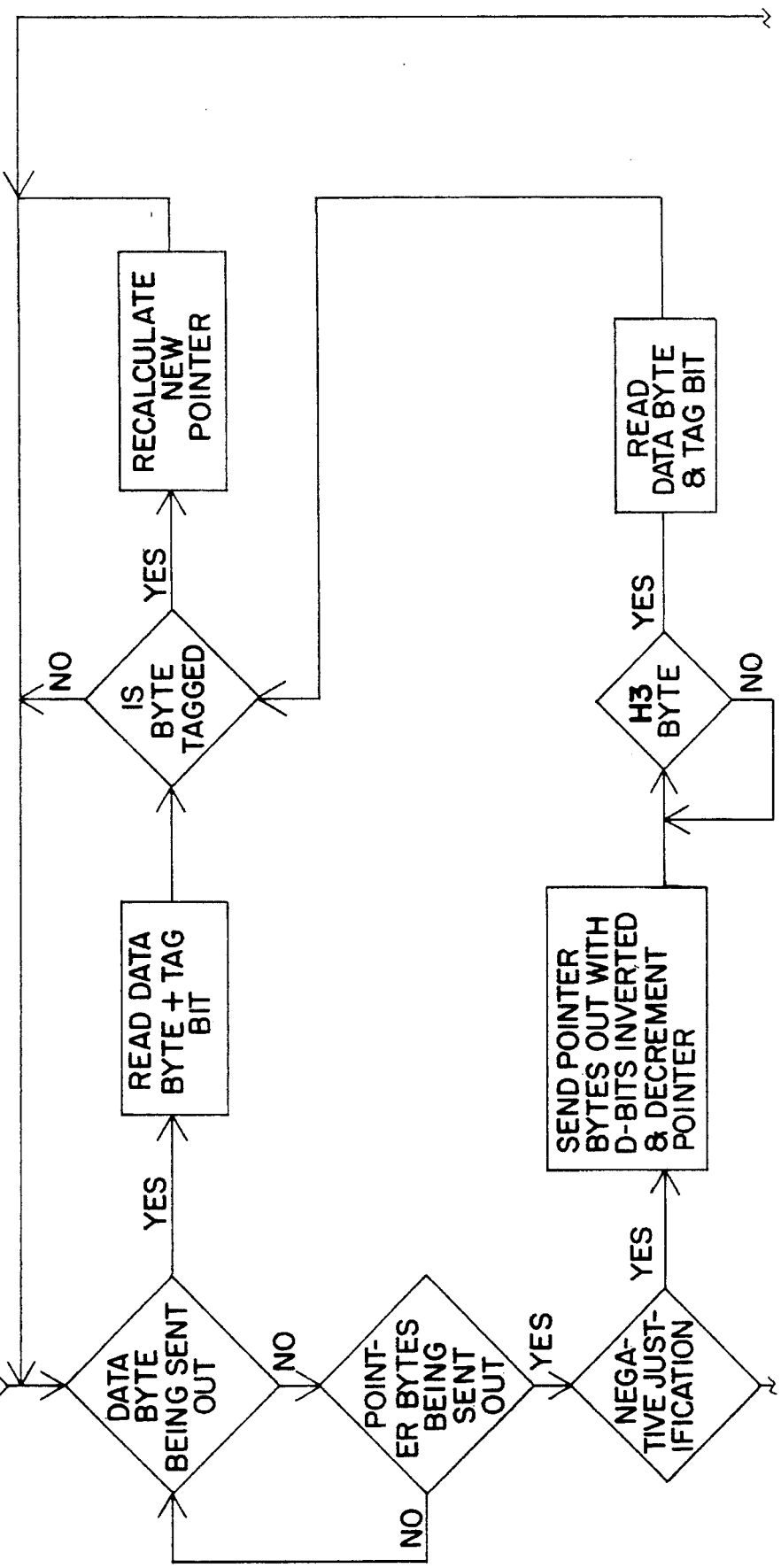
FIG. 5 is composed of FIGS. 5A and 5B which form a flow chart of a generalized pointer generator circuit (PG). Differences between the present invention and prior art are found in the "Recalculate New Pointer" box and "Read Data Byte & Tag Bit" box.
Figure 5B:
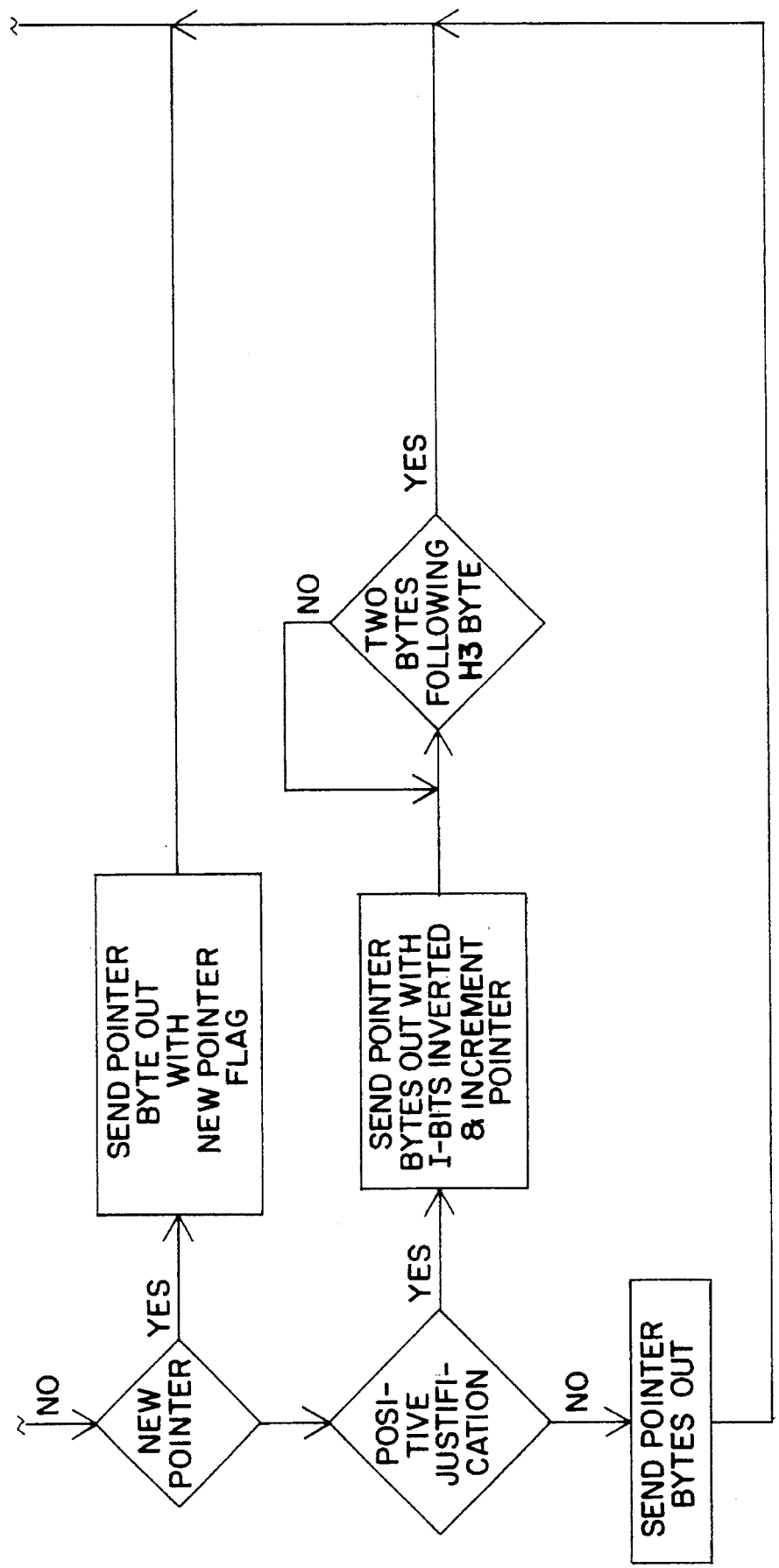

A pointer generator circuit according to the invention is illustrated in FIG. 5, composed of FIGS. 5A and 5B. When the FIFO is half full, the PG begins reading data bytes from the FIFO. The PG determines if the data byte has been tagged. If so according to the conventional procedure, that indicates completion of the countdown by the pointer to the start of the payload data bytes of the oncoming frame. The PG can therefore calculate the new pointer based on the data byte going out in the outgoing frame at the time of the start of the payload data bytes of the incoming frame. This is the conventional procedure for recalculating the new pointer, and leads to the time delay of up to two frame time periods.

According to the present invention, the data byte that is read and tagged by the PG is the data byte immediately following the pointer H1 H2 and holding location H3. There is no waiting through the countdown to the first payload data byte following the trace byte J1. The delay of up to two frames is therefore eliminated. Instead the PG determines the relative position of the incoming frame data byte following H3 relative to the concurrently outgoing data byte of the outgoing frame. This is added to the value of the pointer from the incoming frame previously sent to the PG by the PI. The new pointer value for the outgoing frame is then the remainder after subtracting the modulus corresponding to the highest numbers of data bytes permitted per frame.

For the SONET frames the modulus is 783. For the SDH frames the modulus is 2349. More generally the modulus is the highest number of permitted payload data bytes per frame.

If a negative justification is required the D bits of the pointer from the incoming frame are inverted and a data byte is written in the negative justification data byte holding location H3. The new pointer is sent out. Alternatively, if a positive justification is required, the I bits of the pointer are inverted and a dummy byte or stuff byte in the form of a blank is written in the payload data byte location following H3. At the second data byte location following H3, normal reading of data bytes from the FIFO by the PG resumes.

The invention is of course also applicable to compounded SONET frames and compounded SDH frames. The same formula applies with the modulo selected to be an N multiple of the base frame according to the number of compounded frames. For SONET frames the number N of compounded frames is typically N=1,3,12,24, & 48. However, if the compounded SONET frames are broken into STS-1 frames, then the basic SONET modulus is applied. Similarly if compounded SDH frames are broken into basic frames then the basic SDH modulus is applied.

While the invention has been described with reference to particular example embodiments, it is intended to cover all modifications and equivalents within the scope of the following claims.

I claim:

1. A pointer processing circuit for processing SONET/SDH frames and calculating a new pointer value, said SONET/SDH frames having transport overhead bytes including a pointer (H1 H2) followed by a negative justification data holding byte location (H3), and data payload bytes with a trace byte J1 at the start of the data payload bytes for a particular frame, said pointer pointing to the trace byte J1 for the particular frame, comprising:

a pointer interpreter circuit (PI) constructed to receive an incoming frame, identify the pointer in transport overhead bytes of the frame, interpret the pointer, and send the pointer value directly to a pointer generator circuit (PG), said pointer value indicating the position of the first byte of the data payload bytes of the incoming frame starting at the trace byte J1;

said PI also being constructed to tag the next data byte after the pointer and negative justification data holding byte location (H3) and send the tagged data byte directly to a FIFO without the delay of counting down to the trace byte J1 of the incoming frame;

a first in first out memory (FIFO) coupled to the PI for writing data bytes from the incoming frame into the FIFO;

a pointer generator circuit (PG) coupled to the FIFO for changing the pointer on the outgoing frame, said PG being constructed to determine the position of the tagged data byte relative to the outgoing frame and receive the value of the pointer for the previous incoming frame directly from the PI, said pointer generator being constructed to calculate a new pointer value for the outgoing frame based upon the position of the tagged data byte relative to the outgoing frame and the pointer value for the previous incoming frame thereby reducing delay in changing pointers.

2. The pointer processing circuit of claim 1 wherein the SONET/SDH frame comprises a specified first number of transport overhead byte locations and a specified second number of data payload byte locations;

said pointer generator circuit PG being constructed to calculate the value of the new pointer for the outgoing frame by the formula:

(position of tagged data byte relative to outgoing frame)+(previous value for pointer on incoming frame)

remainder, modulo (highest number of the data payload bytes per frame).

3. The pointer processing circuit of claim 2 wherein the formula modulo is 783N where N is the number of compounded SONET frames.

4. The pointer processing circuit of claim 2 wherein the formula modulo is 2349N where N is the number of compounded SDH frames.

5. The pointer processing circuit of claim 1 wherein the SONET frame comprises byte locations arranged in 9 rows by 90 columns, the first three columns comprising transport overhead bytes followed by 87 columns of data payload bytes, said data payload therefore comprising 783 data byte locations identified as bytes 0–782;

said pointer generator circuit (PG) being constructed to calculate the value of the new pointer for the outgoing frame by adding the position of the tagged data payload byte relative to the outgoing frame and the previous value of the pointer for the incoming frame, and using the remainder modulo 783.

6. The pointer processing circuit of claim 1 wherein the SDH frame comprises byte locations arranged in 9 rows by 270 columns, the first nine columns comprising transport overhead bytes followed by 261 columns of data payload bytes, said data payload therefore comprising 2349 byte locations identified as bytes 0–2348;

said pointer generator circuit (PG) being constructed to calculate the value of the new pointer for the outgoing frame by adding the position of the tagged data payload byte relative to the outgoing frame and the previous pointer value for the incoming frame, and using the remainder modulo 2349.

7. A method of calculating a new pointer in a pointer processing circuit for a SONET/SDH frame, said pointer processing circuit comprising a pointer interpreter (PI), a first in first out memory (FIFO), and a pointer generator (PG), said SONET/SDH frame having transport overhead byte locations including a pointer (H1 H2) followed by a negative justification data holding byte location (H3) and data payload byte locations with a trace byte J1 indicating the start of the data payload bytes for a specified frame, comprising:

receiving an incoming frame at the pointer interpreter (PI) and interpreting the pointer (H1 H2) value to indicate the location of the start of the data payload bytes for said frame starting at the trace byte J1;

sending the pointer value information directly to the pointer generator (PG);

tagging the next data byte after the pointer and negative justification data holding byte location (H3) on the incoming frame and sending the tagged data byte directly to the FIFO;

forming an outgoing frame at the pointer generator (PG), reading out the tagged data byte from the FIFO, and determining the position of the tagged data payload relative to the outgoing frame;

calculating a new pointer value for the outgoing frame based upon the previous pointer value for the incoming frame sent directly to the PG from the PI and the relative position of the tagged data byte in the outgoing frame without waiting to count to the trace byte J1 of the incoming frame thereby reducing delay in changing pointers to a maximum one frame delay.

8. The method of claim 7 comprising the step of calculating a new pointer value for the outgoing frame according to the formula:

(position of the tagged data byte relative to outgoing frame)+(previous value for pointer on incoming frame)

remainder, modulo (highest number of the data payload bytes per frame).

9. The method of claim 8 wherein the SONET frame comprises byte locations arranged in 9 rows by 90 columns, the first three columns comprising transport overhead bytes followed by 87 columns of data payload bytes, said data payload comprising 783 byte locations identified as bytes 0–782 and wherein the formula modulo is 783.

10. The method of claim 8 wherein the SDH frame comprises byte locations arranged in 9 rows by 270 columns, the first nine columns comprising transport overhead bytes followed by 261 columns of data payload bytes, said data payload comprising 2349 byte locations identified as bytes 0–2348 and wherein the formula modulo is 2349.

11. The method of claim 8 wherein the formula modulo is 783N where N is the number of compounded SONET frames.

12. The method of claim 8 wherein the formula modulo is 2349N where N is the number of compounded SDH frames.

* * * * *